May 26, 1970 — G. E. BECK — 3,513,593

SYNTHETIC SOIL BLOCK WITH RECESS

Filed Sept. 14, 1967

INVENTOR.
GAIL EDWIN BECK
BY Frank J. Jordan
ATTORNEY

United States Patent Office 3,513,593
Patented May 26, 1970

3,513,593
SYNTHETIC SOIL BLOCK WITH RECESS
Gail Edwin Beck, Madison, Wis., assignor to American Can Company, New York, N.Y., a corporation of New Jersey
Filed Sept. 14, 1967, Ser. No. 667,758
Int. Cl. B65d 85/50; A01g 9/02
U.S. Cl. 47—34.13   8 Claims

ABSTRACT OF THE DISCLOSURE

In a soil substitute or plant growth medium adapted to be formed into self-supporting shapes, a recess in the medium for receiving and surrounding the stem of a plant cutting for propagation thereof is provided with rib-like projections arranged in a manner tending to maximize the range of cutting sizes and configurations which can be accommodated and propagated therein.

CROSS-REFERENCE

This application incorporates by reference the disclosure in U.S. Pat. 3,467,609 issued Sept. 16, 1969.

BACKGROUND OF THE INVENTION

This invention relates generally to an arrangement for supporting plant cuttings and the like within a synthetic plant growth medium. Traditionally, plants such as geraniums, poinsettias, chrysanthemums, and the like, are started from cuttings planted in greenhouse propagation benches, flats, pots, or similar containers filled with a propagation medium e.g. sand or peat and perlite. More recently, synthetic plant growth media have been used successfully in place of soil for germination and propagation of plants. For example, a known synthetic plant growth medium is disclosed in the aforesaid U.S. Pat. 3,467,609. The growth medium therein disclosed comprises polymer-modified cellulose fibers supplemented by fiber-bonding materials and plant nutrients and formed, for example, by standard pulp-molding or slushed pulp-molding techniques, into felted mats or blocks of the desired shape. This growth medium is characterized by high absorbency and water-holding power, easy penetrability by the plant root structure, freedom from pathogens and resistance to decay and attack by microorganisms, lightweight, and by the savings and labor cost attendant on the use of this material in horticulture. The physical characteristics of the aforesaid medium are such that it may be formed into various self-supporting shapes and sizes while still having a sufficiently soft, felted consistency easily penetrable by the plant root structure.

In order to facilitate use of the medium, vertical recesses are suitably formed into these self-supporting shapes for receiving plant cuttings, the latter including sections cut from a stem, branch, petiole, or root of a growing plant. The recesses extend from the top surface of the medium to a depth to provide sufficient contact with and support for the cutting until it roots. Since cuttings tend to have variable diameters and irregular cross-sectional configurations, it is obviously not practical or feasible to provide a preformed recess having a size and shape to match exactly the configuration of each cutting. Practical and economic considerations dictate that a particular preformed recess be adaptable to accommodate as wide a range of sizes and configurations of cuttings as possible. According to the present invention, it has been found that a vertical recess having an irregularly shaped side wall, as defined by spaced rib-like projections or ribs, tends to maximize the range of cutting sizes and configurations which may be effectively accommodated and successfully propagated in a recess of a particular size and configuration.

SUMMARY OF THE INVENTION

A recess in a synthetic soil or plant growth medium is provided with a plurality of inwardly extending rib-like projections. The stem or petiole of a plant cutting having a size falling within a particular range, upon being inserted into the recess, will tend to compress and deform the projections and to shift the medium forming the projections circumferentially into the spaces therebetween. The projections are subject to varying degrees of deformation or compression, depending on the size of the cutting stem inserted, thereby facilitating support of variable sizes and configurations of cutting stems until rooting occurs. The compressed and deformed medium holds the cutting stem and provides good, firm contact and support therefor, while the medium which has shifted increases the overall contact area with the cutting stem or petiole.

DESCRIPTION OF THE PREFERRED EMBODIMENTS

Figure 1:
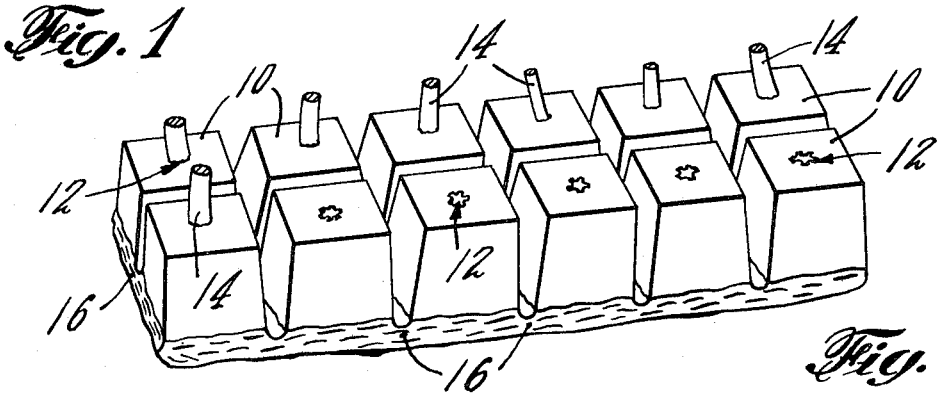
FIG. 1 is a perspective view of self-supporting blocks of synthetic plant growth medium, each block having a top-opening recess to receive a plant cutting, several of the recesses have cuttings therein, but only the lower portions of said cuttings are shown.

Referring to the drawings, FIG. 1 shows a plurality of planting blocks 10, each having a recess 12 therein for receiving a plant cutting 14, only the lower portion or stem of each cutting being shown. Each block 10 serves as the support and growth medium for the propagation and growth of each cutting 14. The planting blocks 10 are made from a synthetic growth medium, for example, polymer-modified wood cellulose fibers of the type disclosed in the aforementioned patent application. The blocks 10 are joined together by a readily severable section 16 of reduced thickness to enable a multi-unit cake to be handled in one piece for starting plant growth during the growing period, and then later severed into individual plant units for repotting or field transplanting.

The multi-unit cake shown in FIG. 1 may be formed by standard pulp-molding or slushed-molding techniques. Pulp-molding processes lend themselves to the preparation of a wide variety of self-supporting shapes, including multi-sided cubes, truncated cones or pyramids, cylinders, or other desirable shapes which may have special adaptability to a given application. Blocks may also be molded to fit within the standard clay pots or special-shaped vessels in which plants are sold to the consumer. In addition to individual blocks and multi-unit cakes, the medium may also be formed into sheets of felted fibrous mats. The mats may be formed by a modified papermaking machine or cylinder or Fourdrinier type such as those commonly utilized in the manufacture of fiberboard, the large sheets being subsequently cut into individual planting blocks or multi-unit cakes of convenient size similar to those obtained by pulp-molding techniques. In each of the forming procedures, the individual fibers become intermeshed and intertangled with one another in a "brush-pile" configuration of low-bulk density and having a porous, spongy nature.

It is desirable to obtain maximum area of contact between the cutting stem and the growth medium to expose a large area of the cutting to the moisture and nutrients in the medium and to provide for physical support of the cutting in a generally upright position. Since cuttings of any particular variety of plant will have various diameters and irregular cross-sectional configurations along their longitudinal lengths, it is desirable that a preformed recess of a particular size and configuration be able to adapt itself to accommodate a range of different sizes and configurations while providing therefor the required contact and support to sustain propagation.

Figure 2:
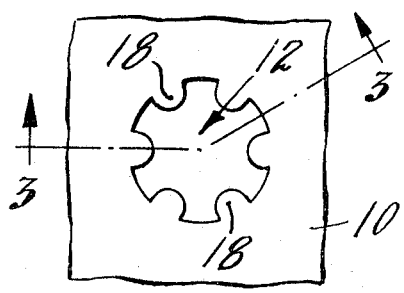
FIG. 2 is a partial plan view of one of the blocks showing the recess therein.
Figure 3:
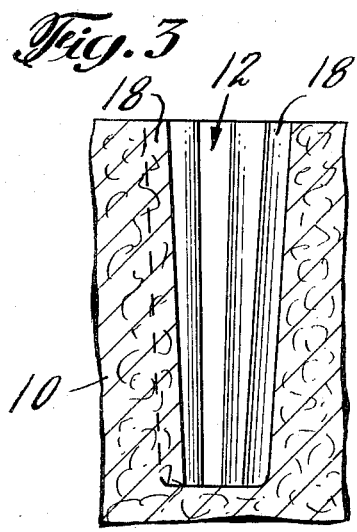
FIG. 3 is a cross-sectional view looking substantially along the line 3—3 of FIG. 2.

As shown in FIGS. 2 and 3, the recess 12 is provided with a plurality of rib-like projections or ribs 18 extending inwardly from the side wall. The ribs 18 extend longitudinally along the recess to engage and support the cutting until it roots. When a cutting 14 of a size falling within a particular range is inserted into the recess 12, the cutting 14 will tend to deform and compress the interfering ribs 18 and to shift the interfering medium circumferentially into the spaces between the ribs 18. The compressed and deformed portions of the medium will tend to hold the cutting 14 to effect firm support while the portions of the medium which have shifted will provide additional contact area between the stem and medium in the space between the ribs 18. The ribs 18 will be compressed and deformed more for the larger sizes of a particular range of cuttings than for the smaller sizes in the particular range. Accordingly, it will be appreciated that the ribbed recess tends to adapt itself to a wide range of cutting sizes and configurations.

The plant growth medium described in the aforementioned patent application, Ser. No. 651,094, is somewhat spongy and thereby possesses some resiliency. Accordingly, when the recess of FIGS. 2 and 3 is used in the aforesaid medium, the compressed and deformed ribs 18 will have some inclination to return to their original configuration and, in so doing, will grip the cutting stem 14 to enhance support and contact.

Preferably, the recess 12 is provided with a taper, with the largest part being at the open top end. With the taper, a range of cutting sizes can be inserted partially into the recess 12 before initial interference with the ribs 18 occurs. This partial interference-free insertion facilitates planting in that it tends to center the cutting in the recess (i.e., it is easier to "find" the recess as it is about to be inserted) and also in that the cutting can be inserted with less initial applied force as would be otherwise encountered were the leading face of the cutting stem to encounter blunt, longitudinal rib ends. Also, when a tapered recess is employed, the interference with the ribs extends to the side of the cutting stem tending to compress the latter somewhat so that there will be less likelihood of damage to the fragile plant cutting as might otherwise occur upon encountering blunt rib ends.

Figure 4:
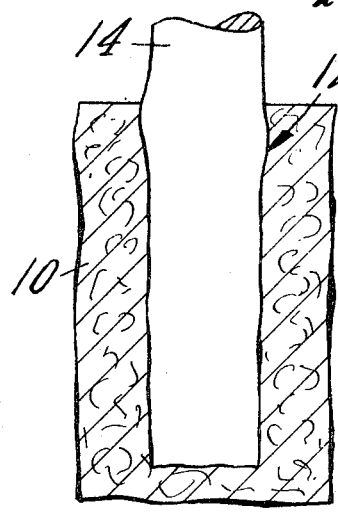
FIG. 4 is a cross-sectional view similar to FIG. 3 but showing the lower end portion of a plant cutting in the recess.

For the smaller size cuttings of a particular size range, sufficient contact and support will be obtained at the bottom portion of the tapered recess 12 to provide for successful propagation. For the larger sizes in the range, the lower longitudinal portion of the ribs 18 will merely be compressed and deformed more. Thus, the tapered recess tends to adapt itself to particular cuttings within a size range. FIG. 4 shows a stem 14 which has been inserted into the recess 12 wherein the lower end portions of the ribs 18 have been completely compressed.

It is preferable that the cutting 14 be inserted all the way into the recess to contact the bottom thereof so as to avoid any air space at the bottom of the recess 12. This is particularly true for plants which root from the bottom of the cutting (e.g., poinsettias). With the spaced ribs 18 projecting radially into the recess, there is a tendency for the cutting, when being inserted into the recess, to scrape off parts of the radially inner parts or faces of the ribs 18, the scraped-off medium falling into the bottom of the recess 12. When the cutting 14 is larger than usual, there will be greater tendency for a larger amount of scrapings to result. Thus, the recess 12 will fill up more, so that the cutting 14 will not have to be inserted as deeply to obtain bottoming, as would be the case of smaller cuttings where the scrapings, if any, would be more limited. Thus, here again, the recess tends to adapt itself to the particular size cutting in that the larger sizes do not have to be inserted as deeply into the smallest bottom part of the originally formed recess.

Figure 5:
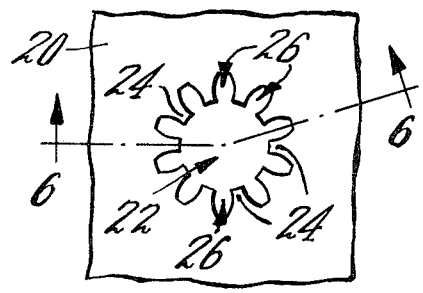
FIG. 5 is a partial plan view of a plant growth medium block having a recess according to an alternate embodiment.
Figure 6:
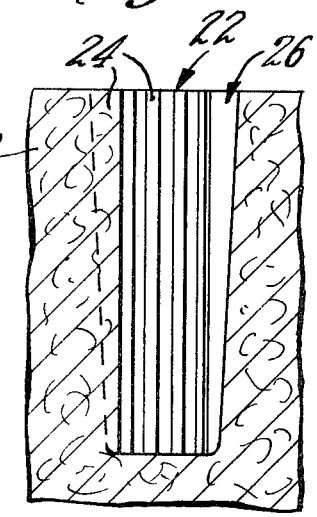
FIG. 6 is a cross-sectional view looking substantially along the line 6—6 of FIG. 5.

FIGS. 5 and 6 show an alternate embodiment wherein a block 20, having a recess 22 with ribs 24, has spaces 26 between the ribs 24 shaped like teeth of a spur gear. This arrangement facilitates manufacturing of the mold in which the block 20 is formed in that a pin (not shown), which projects into the mold to form the recess 22, may be economically and readily manufactured with a conventional gear-cutting machine. In this alternate embodiment, it will be observed that the ribs 24 taper in that they are thicker, considered in a radial direction, closer to the open top end.

It will be appreciated from the above description that the objectives and advantages effected by the rib-like projections can be obtained by a number of rib shapes and designs. Thus, in addition to being arcuate as shown in FIG. 2, the cross-sectional configuration of the ribs may consist of flat surfaces, or a plurality of a combination of flat and arcuate surfaces. Also, instead of extending linearly as in the illustrated embodiment, the ribs may extend arcuately, or a combination of both. However, preferably, the ribs extend longitudinally and linearly in the recess to facilitate the manufacture and withdrawal of the shaped medium body from a mold. Although the recesses have been described as being formed during the pulp-molding operation, it will be understood that the recess may be burned or cut into the plant growth medium after the plant growth medium has molded or otherwise formed. Also, seeds may be germinated by dropping them into the recess of the moist growth medium.

It will be further understood that although the description heretofore deals to a large extent with the plant growth medium described in the aforementioned application Ser. No. 651,094, the recess may be used with other types of synthetic plant growth medium to achieve the desired results.

It is thought that the invention and many of its attendant advantages will be understood from the foregoing description and it will be apparent that various changes may be made in the form, construction, and arrangement of the parts without departing from the spirit and scope of the invention or sacrificing all of its material advantages, the form hereinbefore described being merely a preferred embodiment thereof.

I claim:

1. In a plant growth medium in the form of a felted mat of predetermined shape and dimensions comprising fibers consisting essentially of natural cellulose having chemically bonded therein and thereon by in situ polymerization between about 50 and 500 parts by weight of a polymer of an olefinically unsaturated monomer for each 100 parts of said cellulose fibers, a preformed open top recess extending into said medium adapted to receive variable sizes and configurations of stems of fragile plant cuttings for propagation thereof, said recess having side walls defined at least in part by rib-like projections which are subjected to varying degrees of compression and deformation as a plant cutting stem is inserted, thereby providing firm support of variable sizes and configurations of fragile plant cutting stems until rooting occurs.

2. A plant growth medium as set forth in claim 1 wherein said recess is tapered, being smaller at increasing depths.

3. A plant growth medium as set forth in claim 1 wherein said recess is closed at its bottom.

4. A plant growth medium as set forth in claim 1 wherein said rib-like projections extend longitudinally of the recess.

5. A plant growth medium as set forth in claim 4 wherein said rib-like projections have substantially constant radial thickness along their longitudinal lengths.

6. A plant growth medium as set forth in claim 1 wherein said rib-like projections are semi-circular in cross section.

7. A plant growth medium as set forth in claim 1 wherein said rib-like projections are circumferentially spaced about said recess wall, the spaces between said projections having a configuration, considered in cross section, substantially similar to the gear teeth of a spur gear.

8. A plant growth medium as set forth in claim 1 wherein said rib-like projections are generally vertically disposed and have a decreasing radial thickness along their longitudinal length for greater recess depths.

References Cited

UNITED STATES PATENTS

| | | | |
|---|---|---|---|
| 3,338,390 | 8/1967 | Gordon | 206—16.5 |
| 2,785,969 | 3/1957 | Clawson | 71—64 |
| 3,375,607 | 4/1968 | Melvold | 47—37 |
| 2,594,955 | 4/1952 | Markowitz | 211—69 XR |
| 2,691,849 | 10/1954 | Ehlers | 47—41.11 |
| 2,821,307 | 1/1958 | Linsley | 206—1 XR |
| 2,988,441 | 6/1961 | Pruitt. | |
| 3,180,055 | 4/1965 | Ferrand | 47—37 |

FOREIGN PATENTS 722,589  11/1965  Canada.

ROBERT E. BAGWILL, Primary Examiner

U.S. Cl. X.R.

206—16.5, 65; 211—60